United States Patent Office 2,982,755
Patented May 2, 1961

2,982,755

HEAT-RESISTANT HIGH-TENSILE SILICONE RUBBER COMPOSITIONS AND METHODS OF MAKING THEM

Alfred S. Kidwell, Milford, Aldo J. De Francesco, Hamden, and Zbigniew J. Grabicki, Milford, Conn., assignors to The Connecticut Hard Rubber Company, New Haven, Conn., a corporation of Connecticut No Drawing. Filed Feb. 19, 1959, Ser. No. 794,224

5 Claims. (Cl. 260—37)

This is a continuation-in-part of application Serial No. 628,225, filed December 14, 1956, now abandoned.

This invention relates to cured silicone rubber compositions which have high tensile strength and good elastic properties, and are resistant to aging at elevated temperatures. More particularly, this invention is concerned with a composition of matter comprising a convertible organopolysiloxane, a reinforcing agent described as an alkoxy-protected silica, and a compound compatible with the organopolysiloxane and having either alkaline or acidic properties.

One of the objects of this invention is to improve the method of manufacture of silicone rubber with high tensile strength, good elasticity and high temperature resistance properties. Another object of this invention is to provide a composition of silicone rubber which can be used conveniently for extrusions, as an adhesive, potting compound, caulking compound, or in other applications where curing in a heated press or oven is not desirable. A further object of this invention is to obtain a silicone rubber composition which can be vulcanized effectively at low (room) temperature, or by subjecting it to hot air for a very short time only, without the addition of peroxide-type accelerators, metal oxide or salt-type accelerators, or sulfur-containing accelerators. A still further object of this invention is to obtain a silicone rubber composition which can be vulcanized in the presence of antioxidants, at low temperature or by subjecting it to the action of hot air for a short time, said product having high tensile strength, good elasticity, and resistance to aging at high temperatures.

Heretofore, most of the known processes for vulcanizing silicon rubber have required the use of special vulcanizing agents and prolonged heating at elevated temperatures. There has been no known process whereby cured silicone rubber products having good tensile strength and tear resistance could be obtained in the absence of applied heat Silicone rubber compositions of high tensile strength, good tear strength, and good heat resistance have been manufactured using as the reinforcing agent a hydrophobic powder consisting of an alkoxy-protected silica in super-colloidal state.

The class of products defined as estersils in Iler Patent 2,727,876 are amendable to the process of the present invention.

In order to bring about an intimate dispersion of the pigment in the silicone polymer, we prefer to employ a pigment in which the particle has a radius not greatly in excess of 50 A., or 0.0000005 centimeter. Thus the average distance between particles lies between 0.0000004 and 0.00000004 centimeter, or between 40 and 4 A.

This is an amorphous silica with ultimate particles of silica which are non-porous and have a diameter in the range of 60 to 120 A. These particles are aggregated together in groups. The aggregates are fairly open so that pores between particles may be penetrated by nitrogen gas, for example. The average pore diameter is at least 40 A. The aggregates show a combined surface area including the pores greater than one square meter per gram, but preferably from 250 to 400 square meters per gram. On part of the surface of the aggregates of ultimately smooth silica particles there is chemically combined a surface coating of —OR groups in which R is a hydrocarbon radical of from 1 to 18 carbon atoms. The preferred structure of the —OR groups is such that the carbon atom attached to oxygen is also attached to at least one hydrogen, each —OR group having no more than 18 carbon atoms. Groups of this type are commonly referred to as estersils.

These products are formed by the esterification of a finely divided inorganic siliceous solid with an alcohol of the formula ROH, wherein R is a hydrocarbon radical having at least 2 carbon atoms. Examples of alcohols of this class are normal straight chain alcohols such as ethyl, n-propyl, n-butyl, n-amyl, n-hexyl, n-heptyl, n-octyl, n-nonyl, n-decyl, n-undecyl, n-dodecyl (lauryl), n-tetradecyl (myristyl), n-hexadecyl (cetyl), and n-octadecyl (stearyl); branched chain primary alcohols such as isobutyl, isoamyl, 2,2,4-trimethyl-1-hexanol and 5,7,7-trimethyl-2-(1,3,3-trimethylbutyl) - 1 - octanol; secondary alcohols such as isopropyl, sec-butyl, 2-pentanol, 2-octanol, 4-methyl-2-pentanol, and 2,4-dimethyl-3-pentanol. Examples of alicyclic alcohols are cyclopentanol, cyclohexanol, cycloheptanol, and menthol. Examples of alcohols of the class having ethylenic unsaturation are allyl, crotyl, oleyl (cis-9-octadecen-1-ol), citronellol, and geraniol. Acetylenic unsaturation is illustrated by propargyl alcohol. Araliphatic alcohols are illustrated by benzyl, 2-phenylethanol, hydrocinnamyl, and alpha-methylbenzyl. Cinnamyl alcohol is an example of an alcohol containing both aromatic and ethylenic unsaturation. When saturated primary and secondary alcohols are used as the esterifying agents the resulting ester groups are, of course, alkoxy groups. The saturated primary alcohols are especially useful because they react more readily and at lower temperatures than do secondary alcohols and are more stable than unsaturated alcohols at the temperatures of the reaction. On the other hand, for certain uses, such as incorporation of the esterified silica as a reinforcing filler in certain organic polymers, the silicas esterified with unsaturated alcohols are especially useful since subsequent treatment results in copolymerization of the unsaturated —OR groups on silica with active unsaturated linkages in the partially polymerized organic polymer. Technically, there is no upper limit to the number of carbon atoms which may be present in the esterifying agent. As a practical matter, the group of alcohols having 2 to 18 carbon atoms include the majority of known monohydric alcohols and offer a selection of organic molecule sizes which should be adequate for any purpose.

In the estersil product designated as Valron the —OR groups are butoxy groups which form an organophilic and hydrophobic coating which is known to be removable by heating the silica in presence of oxygen at temperatures above 200° F. The coating is likewise removed when a silicone rubber composition containing the filler is heated in air at temperatures in excess of 200° F.

An essential feature of the invention is the use of finely divided coated silica fillers of the type having at least part of the hydroxyl groups replaced by groups selected from the class consisting of alkoxy, siloxy and isocyanate groups. The siloxane-type fillers in supercolloidal form have an internal structure of silica with a specific surface area of at least 1 $M^2/g$., or preferably 250 to 400 $M^2/g$., having chemically bound to the surface through the hydroxyl groups $O-Si\equiv R_3$ groupings, where R is an alkyl radical containing from 1 to 18 carbon atoms. A preferred form of this siloxy-protected silica is one in which the alkyl group is a methyl group. Also employable in the practice of the invention are isocyanate-coated silica fillers in a supercolloidal state of subdivision, having a specific surface area of the above proportions.

Although alkoxy-protected silicas or estersils exert a vulcanizing effect on the silicone rubber, as explained in the Doede and Kilbourne U.S. Patent No. 2,777,827, such action may be considered too slow for many commercial applications and is only obtained by prolonged heating at elevated temperatures.

A further improvement in compounding and manufacturing silicone rubber compositions containing alkoxy-protected silica is described by T. S. Moroney in U.S. application, Serial No. 590,118. This application discloses that organic compounds containing

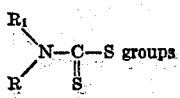

are compatible with antioxidants and are capable of effecting vulcanization of silicone rubber compositions containing an alkoxy-protected silica, resulting in silicone rubber having high tensile and tear strength, high elongation, and good heat resistance. This class of compounds described by Moroney exerts vulcanizing action in the rubber composition at elevated temperatures of at least 200° F. Although the Moroney discovery represents a considerable improvement over the prior art, it does not provide a good method for manufacturing silicone rubber objects which require vulcanization at room temperature, or even at temperatures below 200° F.

The importance of room temperature vulcanization is apparent, for example in production of silicone adhesives, putties, caulking compounds, potting compounds, compounds for making dental impressions, and in extrusion or other preforming operations where manual handling of the formed unvulcanized silicone rubber should be avoided lest it be deformed and where hot air vulcanization is not practical.

Several attempts have been made to develop cold curing silicone rubber compositions but the resulting products were lacking in tensile strength, tear resistance and the other desirable characteristics of the heat cured products.

We have discovered that unexpectedly a new group of materials may be used as vulcanization agents for silicone rubber compositions containing alkoxy-protected silica which do not require heat to effect vulcanization. Products resulting from these compositions have high tensile and tear strength, good elongation and heat resistance properties. We have discovered that these vulcanizing agents are extremely effective in shortening the time of vulcanization, and that said vulcanization may take place efficiently and rapidly at room temperature. We have discovered further that these materials are suitable for use with antioxidants. These vulcanizing agents are only effective when the rubber is reinforced with an alkoxy-protected silica.

These new vulcanizing agents can be described generally as materials having pronounced alkaline or acidic properties in concentrations which do not deteriorate the rubber. We found that mixed silicone rubber compositions comprising an organopolysiloxane and alkoxy-protected silica, will harden considerably and acquire a permanent cure throughout the material without other vulcanizing agents if such compositions are immersed in hot (212° F.) alkaline or acidic water solution. This degree of cure, or vulcanization, is not observed if the same silicone rubber compositions were immersed in hot (212° F.) chemically pure water for the same length of time. Therefore we have discovered that vulcanization of silicone rubber compositions containing alkoxy-protected silica is effected and accelerated by the action of an alkali or acid substance. Ordinary unvulcanized compositions are neutral or slightly alkaline.

Apparently the vulcanization process of silicone rubber compositions containing convertible organopolysiloxane and alkoxy-protected silica is different from the process of peroxide vulcanization of compositions containing other unprotected fillers. Although we do not wish to be limited by any theories, we may suggest, as a possible explanation for this unusual vulcanization action by the alkalies and acids, the acceleration of hydrolysis or cleavage of alkoxy groups from the surface of the protected silica. This may result in formation of reactive groups (such as free radicals) capable of vulcanization or, possibly, reactive sites on the silica surface, also capable of forming bonds with polysiloxane molecules.

We have discovered that alkaline and acidic materials added in small quantities are capable of curing silicone rubber compositions containing alkoxy-protected silica. This cure may be effected in the presence of antioxidants and without the addition of other vulcanizing or accelerating agents. It should be clear to those skilled in the art that we have discovered a new and general method of curing of silicone rubber compositions containing alkoxy-protected silica, that is, by the action of basic or acidic materials.

Silicone rubber is known to be damaged by strong acids or bases through scission of the silicon-oxygen bonds under such conditions. We therefore select acidic and alkaline compounds which are generally classified as weaker acids and bases. The following materials listed with their dissociation constants are examples of effective vulcanizing agents of polysiloxane elastomers in presence of alkoxy-coated silica.

More particularly we have found that acids and bases falling within a particular dissociation constant range are preferred in the practice of the invention. Materials having a dissociation constant within the range of from less than $5 \times 10^{-2}$ to just below neutrality for acids and less than $2 \times 10^{-3}$ to just above neutrality for bases function satisfactorily. Generally any acidic or basic material within these limits falling outside the neutrality zone is satisfactory for the practice of the invention. Stronger acids and bases will also function as effective vulcanizing agents and may be used in some cases, but generally are not preferred because they tend to cause deterioration of the rubber through attack on the polymer chains. The following are examples of such materials:

| Compound: | Dissociation constant |
|---|---|
| Acetamide | $3.1 \times 10^{-15}$ |
| Sec. butylamine | $4.4 \times 10^{-4}$ |

| Compound: | Dissociation constant |
|---|---|
| Diethylamine | $1.26 \times 10^{-4}$ |
| Diisoamylamine | $9.6 \times 10^{-4}$ |
| Diisobutylamine | $4.8 \times 10^{-4}$ |
| Dipropylamine | $1.0 \times 10^{-3}$ |
| Isoamylamine | $5.0 \times 10^{-4}$ |
| Isobutylamine | $3.1 \times 10^{-4}$ |
| Isopropylamine | $5.3 \times 10^{-4}$ |
| Diethylamine | $1.26 \times 10^{-4}$ |
| Methylamine | $5.0 \times 10^{-4}$ |
| Methyldiethylamine | $2.7 \times 10^{-4}$ |
| β-Methyltetramethyldiamine | $5.4 \times 10^{-4}$ |
| Nitroguanidine | $2.2 \times 10^{-14}$ |
| N-propylamine | $4.7 \times 10^{-4}$ |
| Tetramethyldiamine | $5.1 \times 10^{-4}$ |
| Thiourea | $1.1 \times 10^{-15}$ |
| Triethylamine | $6.4 \times 10^{-4}$ |
| Tripropylamine | $5.5 \times 10^{-4}$ |
| Aniline | $4.6 \times 10^{-10}$ |
| p-Anisidine | $1.5 \times 10^{-9}$ |
| p-Bromaniline | $1.0 \times 10^{-10}$ |
| Benzylamine | $2.4 \times 10^{-10}$ |
| Diethylbenzylamine | $3.6 \times 10^{-5}$ |
| Methylaniline | $7.4 \times 10^{-9}$ |
| o-Phenylenediamine | $3.3 \times 10^{-10}$ |
| Phenylhydrazine | $1.6 \times 10^{-9}$ |
| p-Toluidine | $1.5 \times 10^{-9}$ |
| Ethyleneethylamine | $4.4 \times 10^{-4}$ |
| α-Naphthylamine | $9.9 \times 10^{-11}$ |
| β-Naphthylamine | $2.0 \times 10^{-10}$ |
| Brucine | $7.2 \times 10^{-4}$ |
| α-Propylpiperidine | $1.3 \times 10^{-3}$ |
| Quinoline | $1.0 \times 10^{-9}$ |
| Quinine | $2.2 \times 10^{-9}$ |
| Piperidine | $1.6 \times 10^{-3}$ |
| Pyridine | $2.3 \times 10^{-9}$ |
| Strychnine | $1.0 \times 10^{-7}$ |
| Acrylic acid | $5.6 \times 10^{-5}$ |
| Adipic acid | $3.7 \times 10^{-5}$ |
| Succinic acid | $6.6 \times 10^{-5}$ |
| Butyric acid | $1.6 \times 10^{-5}$ |
| Citric acid | $8.2 \times 10^{-4}$ |
| Acetic acid | $1.86 \times 10^{-5}$ |
| Monochloroacetic acid | $1.55 \times 10^{-3}$ |
| Isobutylmaleic acid | $9.0 \times 10^{-4}$ |
| Maleic acid | $1.4 \times 10^{-2}$ |
| Nitrourea | $7.0 \times 10^{-5}$ |
| Oxalic acid | $3.8 \times 10^{-2}$ |
| Propionic acid | $1.4 \times 10^{-5}$ |
| Lactic acid | $1.38 \times 10^{-4}$ |
| Acet-p-toluido-d-propionic acid | $1.0 \times 10^{-4}$ |
| o-Aminobenzoic acid | $1.07 \times 10^{-5}$ |
| Benzoic acid | $6.65 \times 10^{-5}$ |
| Anisic acid | $1.62 \times 10^{-4}$ |
| Benzamid | $1.0 \times 10^{-7}$ |
| o-Benzoyl-benzoic acid | $3.7 \times 10^{-4}$ |
| o-Brombenzoic-acid | $1.45 \times 10^{-3}$ |
| o-Chlorobenzoic acid | $1.32 \times 10^{-3}$ |
| o-Chloro-p-nitrophenol | $1.08 \times 10^{-4}$ |
| 3,6-dichlorophthalic acid | $3.45 \times 10^{-2}$ |
| 2,4-dinitrophenol | $8.0 \times 10^{-5}$ |
| Gallic acid | $3.8 \times 10^{-5}$ |
| o-Nitrobenzoic acid | $6.3 \times 10^{-4}$ |
| o-Oxybenzoic acid | $1.0 \times 10^{-3}$ |
| Phthalic acid | $1.2 \times 10^{-3}$ |
| o-Toluic acid | $1.2 \times 10^{-4}$ |
| Cyclohexene-acetic acid | $2.2 \times 10^{-5}$ |
| Isocamphoric acid | $1.74 \times 10^{-5}$ |
| β-Naphthoic acid | $6.8 \times 10^{-5}$ |
| Uric acid | $1.5 \times 10^{-6}$ |
| Barbituric acid | $1.0 \times 10^{-4}$ |
| p-Cyanophenol | $1.3 \times 10^{-8}$ |

We found that addition of a basic material such as piperidine to a silicone rubber composition containing unprotected fine silica or other filler, but in the absence of alkoxy-protected silica filler, will not cause vulcanization. Addition of the same quantity of piperidine to a silicone rubber composition containing alkoxy-protected silica, but otherwise the same as that described above, causes rapid vulcanization of the rubber composition. If a sufficient amount of the basic material is added the vulcanization will occur during mixing of the materials on a water-cooled laboratory rubber mill. The rate and the degree of vulcanization caused by the alkaline or acidic agents can be controlled. We found, for instance, that the degree of vulcanization caused by the addition of diphenylguanidine is directly related to the amount of diphenylguanidine used. We found further that silicone rubber compositions containing alkoxy-protected silica when vulcanized effectively with alkaline materials selected to be soluble in or compatible with the organopolysiloxane will have outstanding physical properties, that is, high tensile strength, high elongation, high tear strength, and good heat resistance. We have found that even quite large quantities of standard peroxide vulcanizing agents for silicone ruber, or of the dithiocarbamate derivatives of the type described by Moroney (application No. 590,118) will not cause effective curing of silicone rubber composition containing alkoxy-protected silica at room temperature. We have found, however, that addition of alkaline or acidic materials to the silicone rubber compositions containing alkoxy-protected silica, with or without presence of the usual vulcanizing agents mentioned above, will cause effective vulcanization of the silicone rubber composition at room temperature.

We have found that in the absence of the alkoxy-protected silica, the alkaline or acidic materials do not cause effective vulcanization of the composition. The preferred proportions of alkoxy-protected silica in the silicone rubber composition are from 10 to 85 parts per hundred of polysiloxane rubber. The preferred portions of the alkaline or acidic material are from 0.001 to 5.0 parts with a special preference for 0.001 to 2.0 parts per 100 parts of polysiloxane rubber. The quantity of alkaline or acidic material used will depend upon the relative alkalinity or acidity of the material in the silicone rubber composition, and upon the desired rate of vulcanization. These alkaline and acidic agents may be added to the polysiloxane-alkoxy coated silica compositions in a pure form, dissolved or dispersed in a solvent, or some may be added in the form of a salt as is shown in Example X. The acid or base vulcanizing material must be compatible with and soluble in the polysiloxane rubber.

Examples of such alkaline or acidic agents include propylamine, dibutylamine, triethylamine, triethanolamine, hexamethylenediamine, aniline, piperidine, diphenyl-guanidine, Trimene base (which is the commercial name for the products of reaction of ethylchloride, formaldehyde and ammonia), diphenyl guanidine phthalate, hexamethylenediamine carbamate, monochloro acetic acid, benzoic acid, and o-nitrobenzoic acid.

The types of organopolysiloxanes useful in the invention are commonly called dialkyl or alkyl-aryl polysiloxane gums. These organopolysiloxanes are well known in the art and methods of producing such materials are old and widely described in the literature. The convertible organopolysiloxanes referred to are soluble in organic solvents and have a viscosity of from about 2 cs. to non-flowing solids at 25° C. These convertible organopolysiloxanes comprise the recurring structural unit

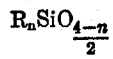

where $n$ is an integer of approximately 1.9 to 2.2 and R is represented by monovalent hydrocarbon radicals, for instance, alkyl, aryl, aralkyl, alkaryl alkenyl, halogenated and pseudo-halogenated (for instance containing CN) aryl, etc., radicals. It is also desirable that in the convertible organopolysiloxane, the majority of the R radicals be lower alkyl radicals, for instance, methyl radicals, and such dialkylsiloxy units comprise at least 50 percent of the total number of organic groups bonded to the silicon atom by carbon-silicon linkages. It is usually preferred that the organopolysiloxanes from which the heat-curable organopolysiloxanes are prepared contain an average of from about 1.98 to about 2.2 organic groups, for instance, methyl groups, total methyl and phenyl groups, etc., per silicon atom, and that more than 98 percent, for example, more than about 99.8 percent, of the silicon atoms of the polysiloxane contain two silicon-bonded organic groups, for instance, alkyl groups, or a mixture of alkyl and aryl groups, etc., per silicon atom. Included specifically in this formula are the dimethylpolysiloxanes, methylphenylpolysiloxane, methylvinylpolysiloxanes and copolymers of such units such as copolymers containing dimethyl- and phenylmethylsiloxane units, and copolymers containing phenylmethyl-, dimethyl- and vinylmethylsiloxane units.

Special advantages of this invention are the ability to cure in the presence of an antioxidant for better heat aging, and the ability to cure at room temperature for uses where the application of heat and pressure required for normal vulcanization of silicone rubber is not practicable, or in the presence of heat-sensitive components. Curing in either of those unusual situations results in a very strong, extensible, tough silicone rubber, exhibiting flexibility at temperatures below −120° F., and extreme resistance to ozone, weathering, and ultra-violet radiation obtainable otherwise only by curing other silicone rubber formulations at temperatures above 200° F.

EXAMPLE I

This example demonstrates that a silicone rubber composition comprising (1) a convertible organopolysiloxane, (2) a reinforcing filler which is alkoxy-protected silica, and (3) an alkaline or acidic compound will vulcanize to an elastomeric material with good physical properties at room temperature. It shows also that this vulcanization is almost ineffective in the presence of unprotected fine silica filler. One hundred parts of a methyl-phenyl-vinyl substituted polysiloxane gum, known as General Electric 81653, was compounded with 55 parts of alkoxy-protected silica known as Valron (product of du Pont de Nemours). Using this composition as a masterbatch, various alkaline and acidic agents were added. Another masterbatch using the same polysiloxane was compounded with 55 parts of a pure finely divided silica known as Cab-O-Sil (product of Godfrey L. Cabot Co.) and the same alkaline and acidic agents were added. Each compound was pressed 5 minutes in a 6 x 6 x .075" mold, then removed from the mold, and tested after standing for 20 hours at room temperature. Half of each sheet after 20 hours at room temperature was placed in an air-circulating oven for 1 hour at 300° F., and tested. Data from these tests are tabulated below.

*Table I*

[Recipe: 100 parts of GE81653; 55 parts of Cab-O-Sil; 0.1 part of curing agent]

| Curing System | Room Temperature—20 hours | | | Room Temperature—20 hours +1 hour at 300° F. | | |
|---|---|---|---|---|---|---|
| | Hardness, Shore A | Tensile Strength, p.s.i. | Elongation, Percent | Hardness, Shore A | Tensile Strength, p.s.i. | Elongation, Percent |
| None | 69 | 90 | 30 | 71 | 240 | 105 |
| Triethanolamine | 73 | 520 | 200 | 78 | 510 | 175 |
| Aniline | 70 | 320 | 120 | 77 | 250 | 90 |
| Trimene Base | 71 | 390 | 120 | 79 | 430 | 125 |
| Sodium Methoxide (25%) | 69 | 190 | 100 | 75 | 410 | 150 |
| Trichloroacetic Acid | 69 | 200 | 70 | 71 | 200 | 35 |
| Monochloroacetic Acid | 65 | 170 | 100 | 75 | 230 | 80 |
| Benzoic Acid | 58 | 80 | 60 | 73 | 220 | 60 |

*Table II*

[Recipe: 100 parts of GE81653; 55 parts of Valron; 0.1 part of curing agent]

| Curing System | Room Temperature—20 hours | | | Room Temperature—20 hours +1 hour at 300° F. | | |
|---|---|---|---|---|---|---|
| | Hardness, Shore A | Tensile Strength, p.s.i. | Elongation, Percent | Hardness, Shore A | Tensile Strength, p.s.i. | Elongation, Percent |
| None | 19 | 20 | 10 | 36 | 160 | 900 |
| Triethanolamine | 49 | 790 | 880 | 58 | 590 | 620 |
| Aniline | 34 | 175 | 740 | 47 | 475 | 840 |
| Trimene Base | 49 | 470 | 600 | 58 | 1,050 | 750 |
| Sodium Methoxide (25%) | 34 | 210 | 670 | 52 | 770 | 720 |
| Trichloroacetic Acid | 35 | 210 | 660 | 50 | 160 | 330 |
| Monochloroacetic Acid | 26 | 80 | 515 | 48 | 590 | 850 |
| Benzoic Acid | 22 | 30 | 100 | 46 | 620 | 900 |

This example shows the superior vulcanizing or strength-enhancing properties of the combination of the alkoxy-coated silica (Valron) and the various alkaline or acidic activating agents. The uncoated silica (Cab-O-Sil) has limited strength-enhancing properties as shown by the generally lower tensile strengths and especially elongations obtained when it is used.

EXAMPLE II

This example demonstrates that effective vulcanization requires the presence of the alkoxy-protected silica, and is directly related to the amount of the alkoxy-protected silica in the compound. One hundred parts methyl-phenyl-vinyl polysiloxane was compounded with various amounts of Valron as listed below. 0.1 part of diphenylguanidine per one hundred parts of gum was added to each compound as the curing agent. Each compound was pressed in a 6 x 6 x 0.075" mold for 5 minutes in a cold press, removed from the mold, and tested after standing for 20 hours at room temperature. Half of the sheet after standing 20 hours at room temperature was further cured for one hour at 300° F. and tested. Physical properties of these compounds are tabulated below.

Table III

| Parts of Valron | Room Temperature—20 hours | | | Room Temperature—20 hours +1 hour at 300° F. | | |
|---|---|---|---|---|---|---|
| | Hardness, Shore A | Tensile Strength, p.s.i. | Elongation, Percent | Hardness, Shore A | Tensile Strength, p.s.i. | Elongation, Percent |
| 5 | 3 | (¹) | (¹) | | | |
| 10 | 5 | (¹) | (¹) | | | |
| 20 | 30 | 130 | 300 | 35 | 200 | 275 |
| 35 | 43 | 360 | 485 | 47 | 600 | 600 |
| 55 | 49 | 300 | 500 | 58 | 1,300 | 800 |
| 65 | 55 | 650 | 650 | 65 | 1,270 | 750 |
| 85 | 63 | 820 | 660 | 73 | 1,250 | 650 |

¹ Too soft to be tested.

EXAMPLE III

This example demonstrates the relationship between the amount of alkaline curing agent and the degree of cure at room temperature. A masterbatch was prepared with 100 parts of methyl-phenyl-vinyl polysiloxane, and 55 parts of alkoxy-protected silica (Valron). The masterbatch was divided and various amounts of diphenylguanidine curing agents were added to different portions on a standard rubber mill. Each compound was pressed in a mold at room temperature for five minutes, then removed from the press and allowed to stand for 20 hours at room temperature. Half of each sheet after the 20 hours at room temperature was cured further for 1 hour at 300° F. Physical properties of the resulting sheets are listed below.

Table IV

| Compound Number | Parts of DPG per 100 parts of Polysiloxane | Room Temperature—20 hours | | | Room Temperature—20 hours +1 hour at 300° F. | | |
|---|---|---|---|---|---|---|---|
| | | Hardness, Shore A | Tensile Strength, p.s.i. | Elongation, Percent | Hardness, Shore A | Tensile Strength, p.s.i. | Elongation, Percent |
| 1 | 0.001 | 25 | 20 | 200 | 39 | 180 | 675 |
| 2 | 0.01 | 30 | 100 | 300 | 42 | 290 | 700 |
| 3 | 0.1 | 49 | 300 | 500 | 58 | 1,300 | 800 |
| 4 | 1 | 56 | 1,140 | 850 | 75 | 1,030 | 500 |

EXAMPLE IV

This example demonstrates that curing of a silicone rubber compound containing alkoxy-protected silica can be effected by alkaline and acidic curing agents and using either of the three standard types of commercially available silicone gum polymers, i.e., dimethylpolysiloxane, methylphenylpolysiloxane, or methyl-phenyl-vinyl polysiloxane. Three compounds were prepared using 100 parts of convertible polysiloxane (one each of the types mentioned above and listed in the table below), 55 parts of alkoxy-protected silica (Valron), and 0.1 parts of diphenylguanidine. Each compound was pressed in a mold for 5 minutes at room temperature, then allowed to stand for 20 hours at room temperature, and a portion of each further cured for one hour at 300° F. Physical properties of the sheets are tabulated below.

Table V

| Compound Number | Polysiloxane | Room Temperature—20 hours | | | Room Temperature—20 hours+1 hour at 300° F. | | |
|---|---|---|---|---|---|---|---|
| | | Hardness, Shore A | Tensile Strength, p.s.i. | Elongation, Percent | Hardness, Shore A | Tensile Strength, p.s.i. | Elongation, Percent |
| 1 | Methylvinyl | 50 | 440 | 825 | 67 | 1,200 | 750 |
| 2 | Dimethyl | 55 | 1,050 | 925 | 65 | 1,300 | 880 |
| 3 | Methylphenyl | 56 | 800 | 750 | 70 | 1,200 | 775 |

EXAMPLE V

This example demonstrates the effectiveness of triethylamine as a room-temperature curing agent for a silicone rubber composition containing the methyl-phenyl-vinyl polysiloxane gum, alkoxy-protected silica, along with an antioxidant and other modifying agents. The following compound was prepared using a standard laboratory rubber mill:

GE81653 _____ parts__ 100
Valron _____ do____ 50
Phenyl-α-naphthylamine _____ do____ 2.0
Triethylamine _____ g__ 0.15

The compound was pressed in a mold and heated for 30 minutes at 325° F., then tested after standing at room temperature for 24 hours. A sample of this press-cured compound was further cured and aged in a hot-air circulating oven at 400° F., as indicated in the table below.

Table VI

| Time of the Test | Hardness, Shore A | Tensile Strength, p.s.i. | Elongation, Percent | Tear Strength, lb. per inch |
|---|---|---|---|---|
| Press Cured | 38 | 810 | 950 | |
| After oven post-cure of 16 hours at 400° F | 64 | 1,320 | 710 | 223 |
| After total of 86 hours at 400° F | 80 | 980 | 475 | 200 |

EXAMPLE VI

A compound suitable for making impressions of teeth as in a dentist's office was made by combining the following ingredients in the proportions shown:

| | Parts |
|---|---|
| Methyl-phenyl-vinyl polysiloxane | 100 |
| GE81499 [1] | 6 |
| Valron | 35 |
| Zinc oxide | 5 |
| Diisoctyladipate | 4 |

[1] GE81499 is a processing aid and comprises 50 parts of dimethyl silicone rubber and 50 parts of diphenylsilane-diol.

After mixing, the compound was placed in the mouth and the jaw closed on it. It was then removed, showing the exact outline of the teeth and gums. The impression was painted with triethylamine. After 25 minutes the impression was no longer plastic and had hardened to form an elastic mold. Molten lead metal was poured into this mold after one day's further standing, and solidified to reproduce a replica of the teeth from which the impression was first taken.

EXAMPLE VII

The following ingredients in amounts shown below were mixed to form a conductive RTV compound:

| | Parts |
|---|---|
| GE81653 | 100 |
| GE81499 | 1.5 |
| Valron | 30 |
| Shawinigan Black | 40 |
| Triethylamine | 0.4 |

After standing 4 days at room temperature, the volume resistivity of the elastic material and the physical properties were:

| | |
|---|---|
| Tensile, p.s.i. | 430. |
| Elongation, percent | 675. |
| Hardness, Shore A | 51. |
| Resistivity | $2.1 \times 10^4$ ohms. cm. |

The same compound, omitting the triethylamine, was dispersed in toluene to a paste of brushing consistency. A piece of polyester panel was covered with this material, and after some drying brushed lightly with triethylamine. After 3 days the panel was covered with approximately 0.01 inch thick layer of vulcanized rubber. The stripped film had similar conductivity and physical properties as previously tested compound.

EXAMPLE VIII

The following ingredients in amounts shown were mixed to form a wire-splicing compound of pasty consistency:

100 parts of GE81653
100 parts of liquid methyl-phenyl polysiloxane
5 parts of GE81499
40 parts of Valron
15 parts of titanium dioxide The joint between two insulation-covered conductors (silicone rubber insulation) was filled with the pasty composition. The outside of the joint was then painted with triethylamine. After 4 days the joint was cut open and found to be fully cured clear to the center and to be free of voids, blisters or soft spots. The adhesion of the composition to the wire and insulation was good.

EXAMPLE IX

A composition of the ingredients shown below with their relative amounts is useful for potting electrical equipment:

| | Parts |
|---|---|
| GE81653 | 100 |
| Liquid methyl-phenyl polysiloxane | 20 |
| GE81499 | 5 |
| Valron | 35 |
| Titanium dioxide | 15 |
| Xylene | 50 |

The end of a multi-conductor connector plug was coated with the fluid-like potting compound and then painted with triethylamine. After three days the compound was free of solvents, and well cured, having desired insulating properties.

EXAMPLE X

The activity of the acidic or basic catalyst may be retarded by temporarily neutralizing it with a weakly basic or acidic chemical to form a salt which is inactive. Such salts of weak acids or bases tend to decompose on heating, making the catalyst available. Examples of such salts are hexamethylenediamine carbamate and diphenyl-guanidine phthalate.

An example of the use of the delayed-action curing system which is very practical for continuous extrusion processes of silicone rubber is given below.

The following ingredients were compounded in proportions shown:

A masterbatch:

| | Parts |
|---|---|
| GE81653 | 100 |
| GE81499 | 2 |
| Valron | 50 |
| Zinc oxide | 20 |

To this masterbatch various amounts of hexamethylenediamine carbamate were added, and extruded in a form of continuous strips into a horizontal oven equipped with a conveyor belt and electric heaters. Temperature was adjusted to 300° F., and the speed of the conveyor belt was such as to allow the extruded rubber to travel 5 minutes through the oven. Results are summarized in Table VII.

Table VII

| | Hexamethylenediamine carbamate, parts | Shore A Hardness after hot-air vulcanization |
|---|---|---|
| 1 | None | 8 |
| 2 | 0.025 | 15 |
| 3 | 0.05 | 21 |
| 4 | 0.10 | 27 |
| 5 | 0.20 | 32 |
| 6 | 2.0 | 60 |

This example demonstrates delayed action, which can be controlled by varying the amount of neutralized curing agents. Extruded rubber after this hot-air vulcanization can be handled without damaging the shape, and may be, if desired, cured further by a subsequent treatment in an oven.

EXAMPLE XI

A methylfluoroalkyl silicone rubber compound (known as LS53 [1], Dow Corning Co.) was mixed (100 parts) with Valron, an alkoxy-protected silica (28.5 parts) and triethylamine (0.75 part), and pressed 5 minutes in a 6 x 6 x .075" mold at room temperature. After 40 hours

---

[1] This compound, newly developed, has been found to be highly resistant to swelling and degradation by many fluids including aromatic and aliphatic fluids and oils.

the compound had hardened due to vulcanization and exhibited the following properties:

| | |
|---|---|
| Hardness, Shore A | 64 |
| Tensile, p.s.i. | 640 |
| Elongation, percent | 510 |
| Tear Strength, p.s.i. | 117 |

This example shows that a solvent-resistant, room-temperature vulcanized compound is a result of the reaction of alkoxy-coated silica and an alkaline catalyst when both are dispersed in the fluorine-containing elastomer present in the Dow Corning compound LS-53.

The examples enumerated above merely illustrate typical formulations made according to the processes of the invention. Changes and alterations may be made without departing from the spirit and scope of the invention.

What we claim is:

1. A vulcanized silicone rubber composition comprising a cured mixture of 100 parts of an organopolysiloxane having the recurring structural unit $$R_nSiO_{\frac{4-n}{2}}$$

wherein $n$ has a value of approximately 1.9 to 2.2 and R is a monovalent hydrocarbon radical selected from the class consisting of alkyl, aryl, aralkyl, alkaryl, alkenyl, and the halogenated derivatives of such radicals and having a viscosity of about 2 cs. to a non-flowing solid in benzene, from about 10 to 85 parts of an organophilic powder in a supercolloidal state of subdivision having an internal structure of inorganic amorphous silica, with a specific pore diameter of at least 4 millimicrons, the internal structure having directly chemically bound to it —OR groups, where R is a hydrocarbon radical of from 1 to 18 carbon atoms, and as a curing agent and acid having a dissociation constant of from less than $5 \times 10^{-2}$ to just below neutrality in an amount of from 0.001 to 5.0 parts per 100 parts of the organopolysiloxane.

2. A vulcanized silicone rubber composition comprising a cured mixture of 100 parts of an organopolysiloxane having the recurring structural unit $$R_nSiO_{\frac{4-n}{2}}$$

wherein $n$ has a value of approximately 1.9 to 2.2 and R is a monovalent hydrocarbon radical selected from the class consisting of alkyl, aryl, aralkyl, alkaryl, alkenyl, and the halogenated derivatives of such radicals and having a viscosity of about 2 cs. to a non-flowing solid in benzene, from about 10 to 85 parts of an organophilic powder in a supercolloidal state of subdivision having an internal structure of inorganic amorphous silica, with a specific pore diameter of at least 4 millimicrons, the internal structure having directly chemically bound to it —OR groups, where R is a hydrocarbon radical of from 1 to 18 carbon atoms, and as a curing agent a base having a dissociation constant of less than $2 \times 10^{-3}$ to just above neutrality in an amount of from about 0.001 to 5.0 parts per 100 parts of the organopolysiloxane.

3. A vulcanized silicone rubber composition as set forth in claim 1, wherein the curing agent is a salt of an acid having a dissociation constant of from less than $5 \times 10^{-2}$ to just below neutrality.

4. A vulcanized silicone rubber composition as set forth in claim 2, wherein the curing agent is a salt of a base having a dissociation constant of from less than $5 \times 10^{-2}$ to just above neutrality.

5. A vulcanized silicone rubber composition comprising a cured mixture of 100 parts of a dimethylpolysiloxane having the recurring structural unit $$R_nSiO_{\frac{4-n}{2}}$$

wherein $n$ has a value of approximately 1.9 to 2.2 and R is a methyl radical and having a viscosity of about 2 cs. to a non-flowing solid in benzene, from about 10 to 85 parts of an organophilic powder in a supercolloidal state of subdivision having an internal structure of inorganic amorphous silica, with a specific pore diameter of at least 4 millimicrons, the internal structure having directly chemically bound to it —OR groups, where R is a hydrocarbon radical of from 1 to 18 carbon atoms, and as a curing agent a base having a dissociation constant of less than $2 \times 10^{-3}$ to just above neutrality in an amount of from about 0.001 to 5.0 parts per 100 parts of the dimethylpolysiloxane.

References Cited in the file of this patent

UNITED STATES PATENTS

| | | |
|---|---|---|
| 2,728,743 | Warrick | Dec. 27, 1955 |
| 2,777,827 | Doede et al. | Jan. 15, 1957 |
| 2,780,611 | TeGrotenhuis | Feb. 5, 1957 |

FOREIGN PATENTS

| | | |
|---|---|---|
| 714,471 | Great Britain | Aug. 25, 1954 |
| 1,088,847 | France | Sept. 15, 1954 |

UNITED STATES PATENT OFFICE
CERTIFICATE OF CORRECTION

Patent No. 2,982,755                                      May 2, 1961

Alfred S. Kidwell et al.

It is hereby certified that error appears in the above numbered patent requiring correction and that the said Letters Patent should read as corrected below.

Column 14, line 17, for "$5 \times 10^{-2}$" read -- $2 \times 10^{-3}$ --.

Signed and sealed this 3rd day of October 1961.

(SEAL)
Attest:

ERNEST W. SWIDER                                      DAVID L. LADD
Attesting Officer                                          Commissioner of Patents

USCOMM-DC